US00RE45823E

(19) United States
(12) Reissued Patent
Vogt

(10) Patent Number: US RE45,823 E
(45) Date of Reissued Patent: Dec. 22, 2015

(54) SYSTEM AND METHOD OF ACOUSTIC DOPPLER BEAMFORMING

(71) Applicant: Teledyne RD Instruments, Inc., Poway, CA (US)

(72) Inventor: Mark A. Vogt, San Diego, CA (US)

(73) Assignee: Teledyne RD Instruments, Inc., Poway, CA (US)

(21) Appl. No.: 13/707,497

(22) Filed: Dec. 6, 2012

Related U.S. Patent Documents

Reissue of:
(64) Patent No.: 7,847,925
Issued: Dec. 7, 2010
Appl. No.: 11/764,397
Filed: Jun. 18, 2007

(51) Int. Cl.
*H04B 1/02* (2006.01)
*G01B 11/26* (2006.01)
*G01C 15/00* (2006.01)

(52) U.S. Cl.
CPC ..... *G01B 11/26* (2013.01); *G01C 15/004* (2013.01)

(58) Field of Classification Search
USPC ..... 356/3.01–3.15, 4.01–4.1, 5.01–5.15, 356/6–22, 28, 28.5
See application file for complete search history.

(56) References Cited

U.S. PATENT DOCUMENTS

| | | | |
|---|---|---|---|
| 3,648,225 | A | 3/1972 | Kritz et al. |
| 3,803,606 | A | 4/1974 | Lebail et al. |
| 4,050,055 | A | 9/1977 | DiLeo |
| 4,062,237 | A | 12/1977 | Fox |
| 4,078,234 | A | 3/1978 | Fishbein et al. |
| 4,138,657 | A | 2/1979 | Shave |
| 4,219,887 | A | 8/1980 | MacCready, Jr. |
| 4,244,026 | A | 1/1981 | Dickey, Jr. |
| 4,270,191 | A | 5/1981 | Peynaud |
| 4,320,765 | A | 3/1982 | Cathignol et al. |
| 4,603,408 | A | 7/1986 | Singhal et al. |
| 4,640,292 | A | 2/1987 | Tykulsky et al. |
| 4,751,847 | A | 6/1988 | Katakura et al. |
| 4,794,574 | A | 12/1988 | Grall |
| 4,799,490 | A | 1/1989 | Namekawa |
| 4,831,874 | A | 5/1989 | Daubin et al. |
| 4,847,817 | A | 7/1989 | Au et al. |

(Continued)

FOREIGN PATENT DOCUMENTS

| | | |
|---|---|---|
| GB | 2 128 833 A | 5/1984 |
| GB | 2128833 | 5/1984 |

(Continued)

OTHER PUBLICATIONS

Haug , "Estimations of Directional Spectra by ML/ME Methods,"Proc. Ocean Wave Measurement and Analysis, pp. 394-405, Jul. 1993.

(Continued)

*Primary Examiner* — Beverly M Flanagan
(74) *Attorney, Agent, or Firm* — Knobbe Martens Olson & Bear, LLP

(57) ABSTRACT

A system and method for forming acoustic beams is disclosed. One embodiment is an acoustic system configured to generate a plurality of beams non-orthogonal to a transducer array simultaneously with a vertical acoustic beam orthogonal to the array. The acoustic system includes a plurality of transducer elements arranged to form a two-dimensional array and electrically connected into rows in a first dimension and columns in a second dimension.

47 Claims, 6 Drawing Sheets

(56) References Cited

U.S. PATENT DOCUMENTS

| | | | | |
|---|---|---|---|---|
| 4,872,146 | A | 10/1989 | Farmer et al. | |
| 4,960,329 | A | 10/1990 | Schofield | |
| 5,208,785 | A | 5/1993 | Brumley et al. | |
| 5,483,499 | A | 1/1996 | Brumley et al. | |
| 5,521,883 | A | 5/1996 | Fage et al. | |
| 5,615,173 | A | 3/1997 | Brumley et al. | |
| RE35,535 | E | 6/1997 | Brumley et al. | |
| 5,689,445 | A | 11/1997 | Vogt et al. | |
| 5,808,967 | A * | 9/1998 | Yu et al. | 367/91 |
| 6,052,334 | A | 4/2000 | Brumley et al. | |
| 6,213,947 | B1 | 4/2001 | Phillips | |
| 6,262,942 | B1 | 7/2001 | Stanton | |
| 6,282,151 | B1 | 8/2001 | Brumley et al. | |
| 6,314,053 | B1 | 11/2001 | Doisy et al. | |
| 6,453,256 | B1 | 9/2002 | Gordon et al. | |
| 6,539,323 | B2 | 3/2003 | Olson | |
| 6,647,804 | B1 | 11/2003 | Deines | |
| 6,700,834 | B2 | 3/2004 | Brumley et al. | |
| 6,701,252 | B2 | 3/2004 | Brown | |
| 6,820,008 | B1 | 11/2004 | van Smirren et al. | |
| 6,937,938 | B2 | 8/2005 | Sansone | |
| 6,947,880 | B2 | 9/2005 | Johnson et al. | |
| 6,983,208 | B2 | 1/2006 | Metcalf et al. | |
| 7,007,555 | B2 | 3/2006 | Strong et al. | |
| 7,173,880 | B2 | 2/2007 | Bernard | |
| 7,267,013 | B2 | 9/2007 | Maier | |
| 7,277,359 | B2 | 10/2007 | Bernard | |
| 7,317,660 | B2 | 1/2008 | Brumley et al. | |
| 7,343,793 | B2 | 3/2008 | Tillotson et al. | |
| 7,352,651 | B2 | 4/2008 | Lohrmann et al. | |
| 7,379,387 | B2 | 5/2008 | Strong et al. | |
| 7,420,875 | B1 | 9/2008 | Hendricks | |
| 7,545,705 | B2 | 6/2009 | Brumley et al. | |
| 2002/0018400 | A1 | 2/2002 | Brumley et al. | |
| 2002/0124629 | A1 | 9/2002 | Hurson | |
| 2003/0214880 | A1 * | 11/2003 | Rowe | 367/103 |
| 2004/0184350 | A1 * | 9/2004 | Brumley et al. | 367/90 |
| 2005/0199056 | A1 | 9/2005 | Strong et al. | |
| 2006/0155492 | A1 | 7/2006 | Strong et al. | |
| 2008/0080313 | A1 | 4/2008 | Brumley et al. | |
| 2008/0080314 | A1 * | 4/2008 | Brumley et al. | 367/89 |
| 2008/0080315 | A1 | 4/2008 | Vogt | |

FOREIGN PATENT DOCUMENTS

| | | |
|---|---|---|
| JP | HEI 3-53605 | 12/1992 |
| JP | 07-218254 | 8/1995 |
| JP | 10-197549 A | 7/1998 |
| JP | 10197549 | 7/1998 |
| JP | 2948472 | 7/1999 |

OTHER PUBLICATIONS

Kirlin, R. Lynn, Estimation of Transfer Function Parameters with Output Fourier Transform Sensitivity Vectors. 1997 IEEE International Conference on Acoustics, Speech and Signal Processing (Cat. No. 97CB36052) Munich, Germany, Apr. 21-24, 1997, pp. 3933-3936 vol. 5.

MGD Technologies, Inc.: "Acoustic Doppler Flow Meter Technical Manual", P/N 955-6002-00, Jan. 2000.

Pinkel, R. et al. (1987) Open ocean surface wave measurement using Doppler sonar. Journal of Geophysical Research V.92, No. C12:12,967-12.97.3.

PCT, International Search Report and Written Opinion issued on Mar. 11, 2009 for International application No. PCT/US2008/066778.

MGD Technologies, INc.: "Acoustic Doppler Flow Meter Technical Manual", P/N. 955-6002-00, Jan. 2000.

Gargett, Ann: "Observing Turbulence with a Modified Acoustic Doppler Current Profiler", Journal of Atmospheric and Oceanic Technology, vol. 11, Dec. 1994, pp. 1592-1610.

Dewey et al.: "Higher Moment Flow Parameters from Various ADCP Transducer Configurations", 2005, University of Victoria, 21 pages.

Terray et al.: "Measuring Waves and Currents with an Upward-Looking ADCP", Proceedings of the IEEE Sixth Working Conference on Current Measurement, Mar. 1999, pp. 66-71.

Rasmussen, Egil: "5 Beam 600k Hz Workhorse—Application Note", Teledyne RD Instruments, Feb. 14, 2007, 8 pages.

Glad, I.K., et al. (1992) The maximum-likelihood property of estimators of wave parameters from heave, pitch, and roll buoys. American Meteorological Society V.9:169-173.

Hashimoto, N., et al. (1996) Improvement of submerged Doppler-type directional wave meter and its application to field observations. Coastal Engineering 629-642.

Herbers, T.H., et al. (1991) Field Verification of Acoustic Doppler Surface Gravity Wave Measurements. Journal of Geophysical Research V.96, No. C9:17,023-17,035.

Krogstad, H.E., et al. (1988) High-resolution directional wave spectra from horizontally mounted acoustic Doppler current meters. Journal of Atmospheric and Oceanic Technology V.5, No. 4: 340-352.

Pinkel, R. et al. (1987) Open ocean surface wave measurement using Doppler sonar. Journal of Geophysical Research V.92, No. C12:12,987-12.973.

Smith, J. A. (1989) Doppler sonar and surface waves: range and resolution. Journal of Atmospheric and Oceanic Technology V6:680-696.

Smith, J.A., et al. (1995) Directional surface wave estimates from Doppler sonar data. Journal of Atmospheric and Oceanic Technology V.12:617-632.

Stockhausen, W.T. (1994) Directional wave spectra using an acoustic doppler current profiler. A Thesis. Library of the Virginia Institute of Marine Science.

Takayama, T., et al. (1994) Development of a submerged Doppler-type directional wave meter. Coastal Engineering C.46:624-634.

Terray, E.A., et al. (1990) Measuring wave direction using upward-looking Doppler sonar. Proceedings of the IEEE Fourth Working Conference on Current Measurement 1-6 and Fig. 1-Fig. 4.

Terray, E., et al. (1997) Measuring wave height and direction using upward-looking ADCP's. IEEE Oceans '97 1-4.

Visbeck, M., et al. (1995) Sea surface conditions remotely sensed by upward-looking ADCP's. Journal of Atmospheric and Oceanic Technology V12:141-149.

Zedel, L. (1994) Deep ocean wave measurements using a vertically oriented sonar. Journal of Atmospheric and Oceanic Technology V.11:182-191.

Allender, et al., "The WADIC Project: A Comprehensive Field Evaluation of Directional Wave Instrumentation,"Ocean Engineering, vol. 16, No. 56, pp. 505-536, 1989.

Krogstad, "Maximum Likelihood Estimation of Ocean Wave Spectra from General Arrays of Wave Gauges,"Modeling, Identification, and Control, vol. 9, No. 2, pp. 81-97, 1988.

Terray E. et al., Measuring Waves and Currents With an Upward-Looking ADCP IEEE 1999, 66-71.

International Search Report and Written Opinion issued on Mar. 11, 2009 for International application No. PCT/US2008/066778.

* cited by examiner

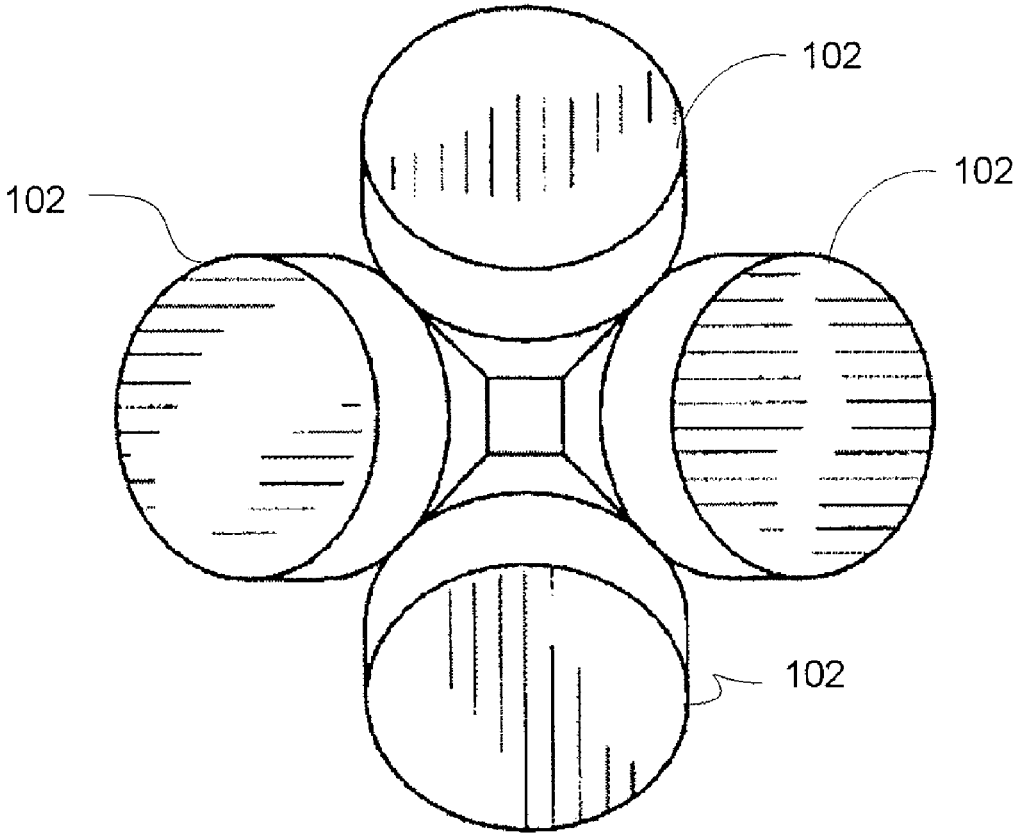
(Prior Art)
FIG. 1
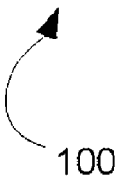

SYSTEM AND METHOD OF ACOUSTIC DOPPLER BEAMFORMING

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

1. Field of the Invention

The present invention relates to acoustic transducers and beamformers that form simultaneous multiple beams in multiple planes.

2. Description of the Related Technology

Devices such as Acoustic Doppler Velocity Sensors (ADVS) are widely used for measurement of vertical profiles of water current measurements and for earth and/or water referenced velocity measurement for vessel navigation. Acoustic Doppler Current Profilers (ADCP) are used in freshwater environments such as rivers, lakes and estuaries, as well as in saltwater environments such as the ocean, for studying the effects of current velocities. The measurement of accurate current velocities is important in such diverse fields as weather prediction, biological studies of nutrients, environmental studies of sewage dispersion, and commercial exploration for natural resources, including oil.

Such devices measure 3-axis velocities by measuring velocity along lines of position defined by narrow acoustic beams. Three or more beams oriented at different directions may be used to measure the three orthogonal velocity components. Such devices may employ four narrow (e.g., 1° to 4°) conical transmit/receive beams are employed positioned in two axes of a plane surface and inclined relative to the normal to that plane. In this configuration, which is referred to as a Janus configuration, two sets of narrow conical beams are symmetrically inclined outward and positioned at four 90° circumferential increments on the surface of a larger (typically 60°) outward opening cone. Marine instrumentation is frequently used in environments that are sensitive to one or more of size, power consumption, and cost. Accordingly, a need exists for suitable methods and apparatuses for generating acoustic beams for use in ADVS and ADCP devices.

SUMMARY OF CERTAIN INVENTIVE ASPECTS

The system, method, and devices of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description of Certain Embodiments" one will understand how the features of this invention provide advantages such as a compact, low complexity beam forming system that provides a vertical beam formed in the aperture of a two dimensional transducer array along with beams formed in at least two other dimensions.

One embodiment includes an acoustic system. The acoustic system includes a plurality of transducer elements arranged to form a two-dimensional array and electrically connected into rows in a first dimension and columns in a second dimension. The acoustic system further includes at least two first beamforming circuits configured to generate a plurality of beams in at least two planes. Each of the beams defines a non-orthogonal angle with the transducer array. The acoustic system further includes a second beamforming circuit connected to each of the beamforming circuits and configured to generate a beam orthogonal to the transducer array. Each of the first beamforming circuits is electrically connected to each of the transducer elements so that each of the transducer elements contributes to each of the beams in the at least two planes.

One embodiment includes a system for generating a plurality of acoustic beams. The system includes means for generating a plurality of acoustic signals. The generating means includes a plurality of means for converting between an electrical signal and a respective one of the acoustic signals. The converting means are arranged to form a two dimensional array and electrically connected into rows in a first dimension and columns in a second dimension. The system further includes means for simultaneously forming a plurality of first beams in at least two planes based on the acoustic signals. Each of the first beams defines a non-orthogonal angle with the transducer array and wherein each of the first beams is based on each of the respective plurality of signals of each of the converting means. The system further includes means for forming a second beam orthogonal to the array based on the acoustic signals. The first and second beams are formed simultaneously.

Another embodiment includes a method of generating a plurality of acoustic beams. The method includes generating a plurality of acoustic signals in each of a plurality of transducer elements arranged to form a two dimensional array and electrically connected into rows in a first dimension and columns in a second dimension. The method further includes simultaneously forming a plurality of first beams in at least two planes based on the acoustic signals. Each of the first beams defines a non-orthogonal angle with the transducer array and wherein each of the first beams is based on each of the respective plurality of signals of each of the transducer elements. The method further includes forming a second beam orthogonal to the transducer array based on the acoustic signals. The first and second beams are formed simultaneously.

BRIEF DESCRIPTION OF THE DRAWINGS

FIG. 1 is a top view of a prior art 4-piston transducer array having a Janus configuration.

DETAILED DESCRIPTION OF CERTAIN EMBODIMENTS

The following detailed description is directed to certain specific embodiments of the invention. However, the invention can be embodied in a multitude of different ways as defined and covered by the claims. In this description, reference is made to the drawings wherein like parts are designated with like numerals throughout.

ADVS and ADCP devices may include transducer and beamforming devices for generating the acoustic beams used to measure water velocities. For example, FIG. 1 is a top view of a prior art 4-piston transducer array 100 in Janus configuration. Such a 4-piston Janus transducer assembly comprises four independent circular piston-type transducers 102, each producing a single narrowly dispersed conical transmit/receive beam directed normal to the piston face. The four transducers are physically positioned in a rigid assembly to direct the output of the transducers 102 so as to generate the Janus beam configuration.

Figure 2:
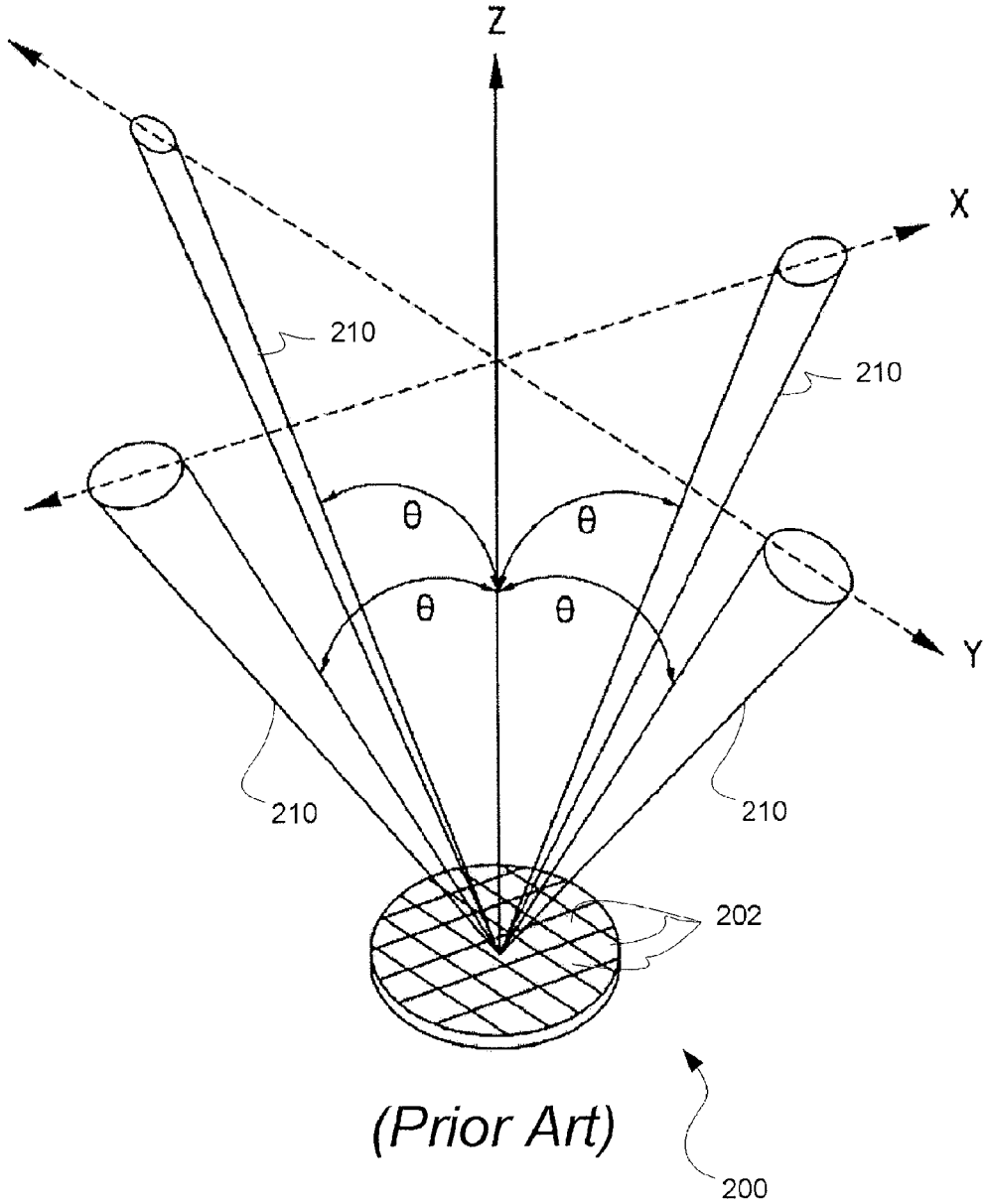
(Prior Art) FIG. 2
FIG. 2 is a perspective view illustrating a configuration of four acoustic beams inclined relative to one embodiment of a two dimensional transducer array.

FIG. 2 is a perspective view illustrating a configuration of four acoustic beams 210 inclined relative to one embodiment of a two dimensional transducer array 200. In the embodiment illustrated in FIG. 2, the transducer array 200 comprises a two dimensional array of transducer elements 202 configured to generate simultaneously generate the beams 210. One embodiment of such a transducer array and a suitable beamformer are disclosed in U.S. Pat. No. 5,808,967, which is hereby incorporated by reference in its entirety.

Figure 3:
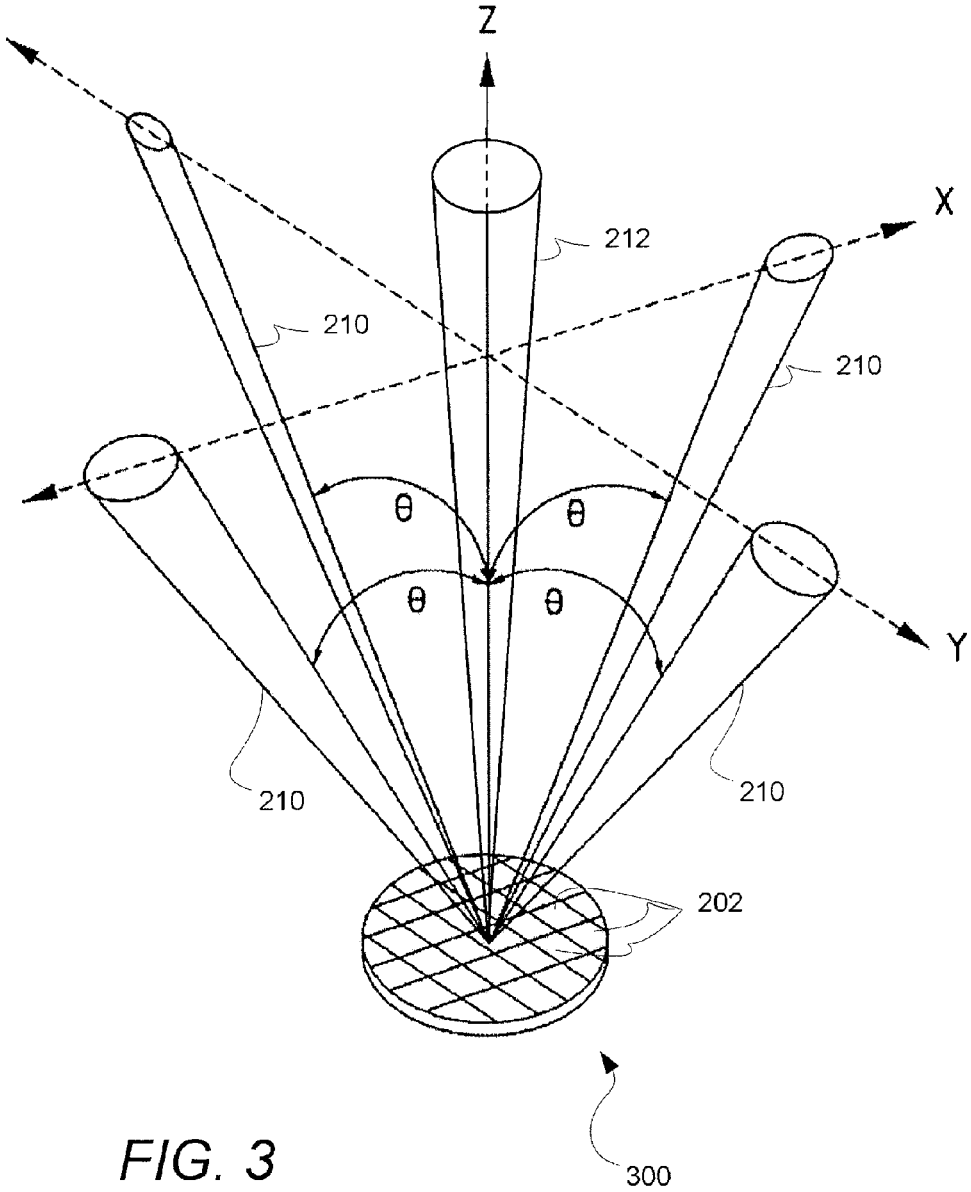
FIG. 3 is a perspective view illustrating one embodiment of a two dimensional transducer array along with a configuration of four acoustic beams inclined relative to the array and a fifth beam normal to the array.

FIG. 3 is a perspective view illustrating one embodiment of a two dimensional transducer array 300 along with a configuration of four acoustic beams 210 inclined relative to the array and a fifth beam 212 normal to the array. In some applications, it is desirable to add the additional vertical beam 212 to the two dimensional beams 210. For example, such an additional beam 212 is useful for wave measurements, echo sounder measurements, Reynolds stress measurements, Doppler velocity measurements, and bathymetry. The fifth vertical beam 210 also allows Doppler velocity measurements even at extreme tilt angles, without gimballing of the transducer. Moreover, as noted above, marine instrumentation is frequently used in environments that are sensitive to one or more of size, power consumption, and cost. Accordingly, in one embodiment, the system 300 includes a low (added) complexity beamformer using a phased array of transducers 202 to generate the vertical beam 212 in addition to other, e.g., Janus, beams 210. In one embodiment, the vertical beam 212 can be formed in a single aperture along with the other beams.

Figure 4:
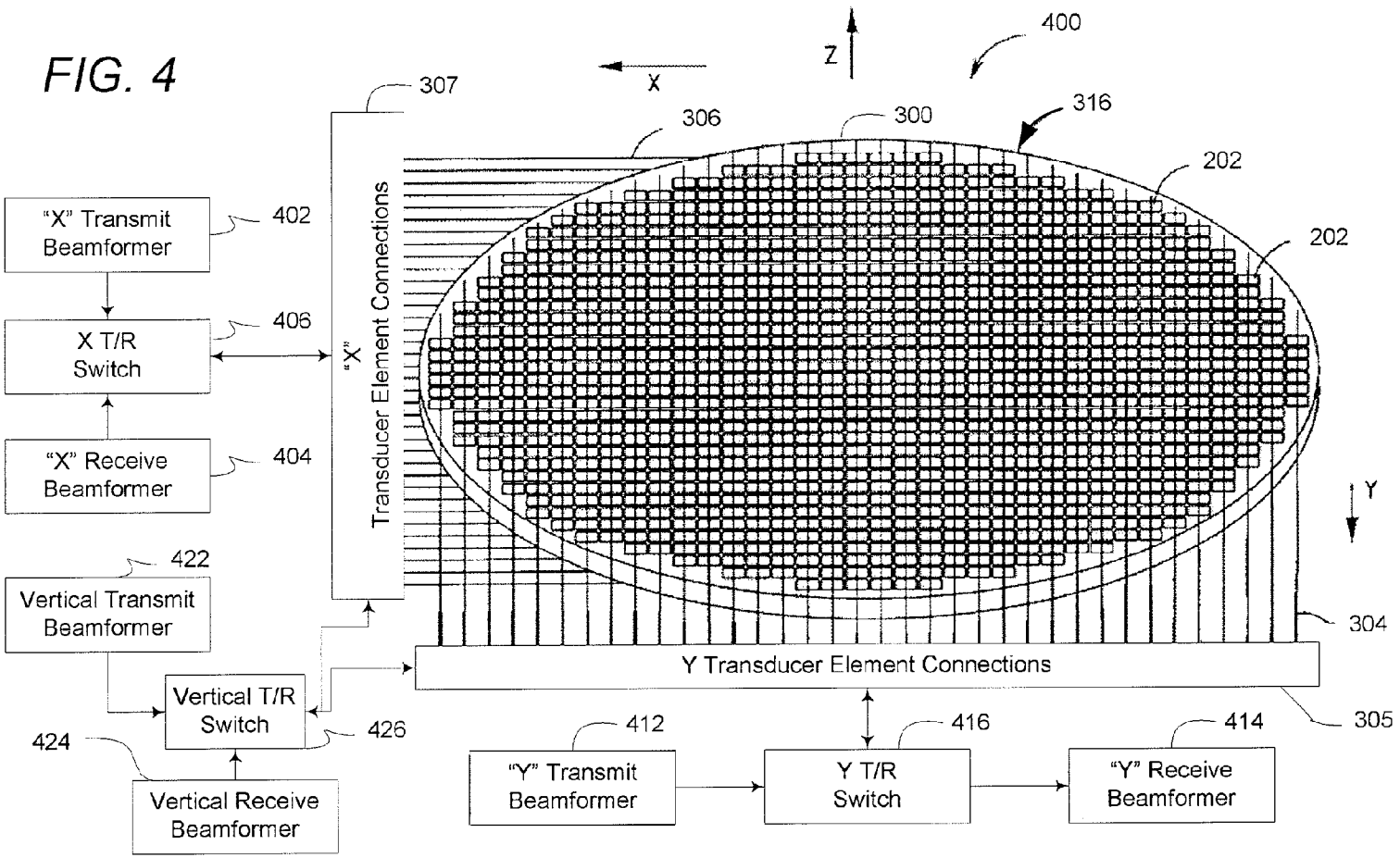
FIG. 4 is a schematic diagram illustrating one embodiment of an acoustic system configured to generate a plurality of inclined acoustic beams and a vertical acoustic beam of FIG. 3.

FIG. 4 is a schematic diagram illustrating one embodiment of an acoustic system 400 that is configured to generate a plurality of inclined acoustic beams 210 and a vertical acoustic beam 212 using the transducer array 300 of FIG. 3. The coordinate system used for the purposes of this description is as shown with rows 306 oriented in the X axis, columns 304 in the Y axis, and the Z axis normal to the plane face 316. The transducer elements 202 are electrically interconnected along columns ("Y") 304 (and collectively identified as "Y" connections 305) and rows 306 (and collectively identified as "X" connections 307). The "X" connections 307 are connected to an "X" transmit beamformer 402 and an "X" receive beamformer 404 via a transmit/receive switch 406. The "Y" connections 305 are connected to a "Y" transmit beamformer 412 and a "Y" receive beamformer 414 via a transmit/receive switch 416. The transmit beamformers 402 and 412 and receive beamformers 404 and 414 may be either phase or time-delay beamforming networks. In one embodiment, a common mode connection connects a vertical transmit beamformer 422 a vertical receive beamformer 424 to the "X" connections 307 and the "Y" connections 305 via a transmit/receive switch 424. It has been found that such a common mode connection provides a simple and compact way of connecting the vertical beamformers 422 and 424 to the array 300. In on embodiment, the rows 306 are connected on the back sides (not shown) of each transducer element 202 and the columns 304 are connected to the front sides (e.g., along the face 316) of each transducer 202.

Any suitable beamformer may be used, including the beamformers disclosed in the above incorporation U.S. Pat. No. 5,808,967. Each of the beamformers 402, 412, 422, 404, 414, and 424 may comprise suitable amplifiers and receivers for processing transmitted and received signals. The beamformers 402, 412, 422, 404, 414, and 424 may be further connected to one or more processors configured to process the signals.

In one embodiment, the array 300 is formed from several cylindrical discs (each having a diameter about equal to that of the final array), which are sequentially bonded together and partially sliced with a parallel diamond blade saw at various stages of the process such that the sliced elements are rigidly held together by a solid layer. When completed, the array 300 is internally diced into the desired form with the suitable precision, and held in shape by the combination of a mechanically rigid and acoustically transparent front facing and a solid backing disc.

In the illustrated array 300 of FIG. 4, the array face 316 defines a substantially circular shape. However, other form factors such as ellipses or polygons, which are generally symmetrical in the two face dimensions, are also suitable for forming narrow inclined beams of general conical form. Each of the transducer elements 202 have substantially symmetrical faces that define circular, or rectangular forms (i.e., in their facial cross-section). The face width of each element is approximately $0.5\lambda$, where $\lambda$ is the acoustic wavelength in water of the desired center frequency. For example, to form beams with 4° beam width, an array diameter of approximately $16\lambda$ is desirable, comprising a 32×32 element array of approximately 800 elements. The back side rows 306 (X direction) and front side columns 304 (Y direction) of the array elements 202 are electrically connected together along parallel lines of elements with acoustically transparent material. The rows and columns may be orthogonal to each other.

Figure 5:
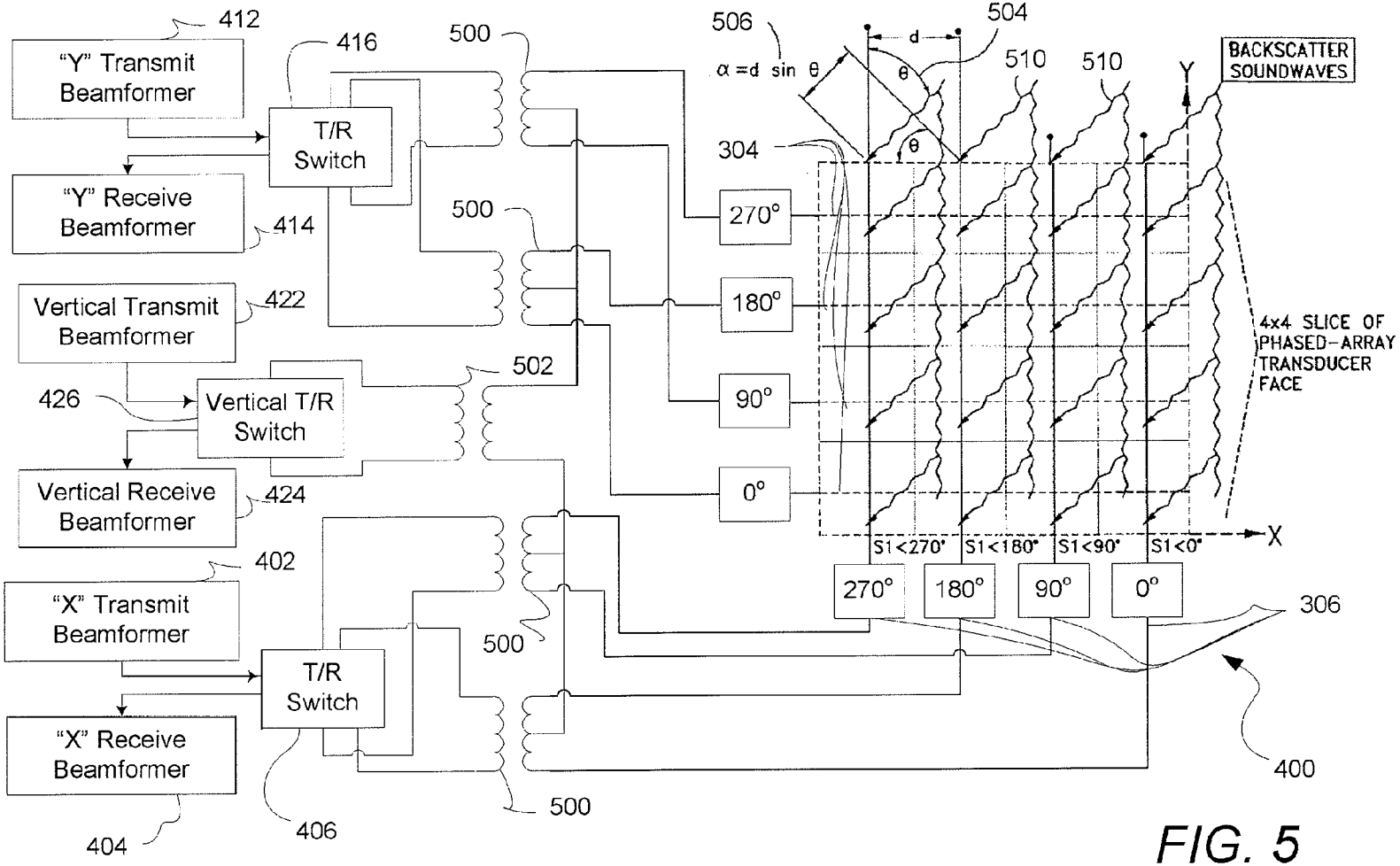
FIG. 5 is a schematic diagram illustrating in more detail one embodiment of the acoustic system illustrated in FIG. 4 when configured to receive the beams.

FIG. 5 is a schematic diagram illustrating in more detail one embodiment of the acoustic system 400 when configured to receive the beams 210 and 212. It is to be recognized that while a 4×4 array is illustrated, arrays may have any suitable number of elements 202, e.g., 32×32 arrays of elements 202.

The spacing of the elements 202 is determined by reference to the desired operating parameters. For example, during receipt of a long tone burst acoustic signal at a single frequency (narrowband), f, with wavelength, $\lambda=c/f$, where c is the sound propagation velocity in the fluid media, incoming sound wavefronts traveling in the negative X direction and at an angle $\theta$ with the Z axis (Z being normal to the array plane, or normal to the plane of the Figure) travel different distances to each of the Y-axis (frontside) column line-arrays 304, and thus strike each of the line arrays at different times, and in general, with different phases. The path length differences 506, $\alpha$, between adjacent line-arrays is related to the element center-to-center separation distance (d) by $\alpha=d \sin \theta$. The wavefront arrival time differences between adjacent line-arrays is $\tau=\alpha/c=(d//c)\sin \theta$. If the elements are spaced at distances corresponding to a half-wavelength of the arriving narrowband signal ($d=\lambda/2$), the path length difference expressed in terms of arriving signal wavelengths is given by $\alpha=(\lambda/2)\sin \theta$. For an arrival angle of 30°, $\alpha(\lambda/2)\sin 30°=\lambda/4$, which corresponds to an inter-element angular phase shift of 90° for arriving narrowband signals. Thus, when a narrowband pulse is being received by all Y-axis line-arrays with the backside coupled to virtual grounds, the received electrical signal phases along the set of four Y-axis line-arrays will be 0, 90, 180, and 270 degrees, respectively.

Each of the rows 304 and columns 306 is configured to be phase shifted from each adjacent row 304 or column 306. For example, in the illustrated embodiment, each row 304 and column 306 is phase shifted by 90° from each adjacent row 304 or column 306. The "X" transmit/receive switch 406 is connected to a pair of transformers 500 that are each connected across pairs of the columns 306 that are shifted 180° in phase. For example, connected to the "X" transmit/receive switch 406 is one transformer 500 connected across the columns 306 shifted by 0° and 180° relative to the transducer column 306 closest to the Y axis and another transformer 500 is connected across the columns 306 shifted by 90° and 270° to the transducer column 306 closest to the Y axis. Similarly, connected to the "Y" transmit/receive switch 406 is one transformer 500 connected across the rows 304 shifted by 0° and 180° relative to the transducer rows 304 closest to the X axis and another transformer 500 is connected across the rows 304 shifted by 90° and 270° to the transducer row 304 closest to the X axis.

A transformer 502 is connected to center taps of each of the transformers 500 and to the vertical beamformers 422 and 424 via the switch 426. In particular, the transformer 502 connects the center taps of the transformers 500 that connect to the rows 304 with the center taps of the transformers 500 that connect to the columns 306. This connection of the transformer 502 creates a common mode connection between the rows and columns.

In one embodiment, the vertical beamformers 422 and 424 are connected to each of the transducer elements 202. Thus, in such an embodiment, the vertical beam 212 has an aperture that is greater than the non-orthogonal beams 210 by 1/cos (beam angle). Where a wider vertical beam 212 is desired, less than all of the rows and columns is connected to the vertical beamformers 422 and 424 to create a smaller aperture array for the vertical beam 212. For example, the aperture of the vertical beam 102 may be reduced to reduce sensitivity to tilt of the array 300. In one such embodiment, a group of rows and columns in a central region of the array 300 is connected to the vertical beamformers 422 and 424 to create the "sub-array" for forming the vertical beam 212.

While only a 4×4 section of the array 300 is illustrated, it is to be recognized that the rows 306 and columns 304 of an array 300 larger than 4×4 may also be constructed in which the four signal phases are repeated in additional 4×4 sets of rows and columns. For example, a 32×32 array may comprise 8 repeating sets of the 4 illustrated rows 306 having phase shifts of 0°, 90°, 180°, and 270° and 8 repeating sets of the four illustrated columns 304 having phase shifts of 0°, 90°, 180°, and 270°. The rows 306 and columns 304 with each particular phase shift are summed and connected in parallel to the corresponding transformer 500 (e.g., each input of the transformer 500 is connected to 8 rows or 8 columns in parallel). Each 4×4 increase in size of the array 300 further enhances the interference patterns at ±30°. When additional sets of such four line-array segments are utilized as described, the acoustic signal gain along the ±30° directions is increased, or correspondingly, the beamwidth in that direction is reduced, as additional such sets of arrays are added.

In receive operation, acoustic signals are converted to electrical signals by the transducer elements 202 and received by the beamformers 404, 414, and 424. The "X" and "Y" beamformers 404 and 414 simultaneously form non-orthogonal beams 210 in at least two planes such as the Janus beams of FIG. 3 while the vertical beamformer 424 simultaneously forms the vertical beam 212. Each set of four X-axis electrical signals (rows 306 or columns 304) are connected to virtual ground nodes (not shown) in the receiver preamplifier of the receive beamformers 404 and 414 to form a signal reference for the backside rows, and phase shifted −90° between adjacent line-arrays (0°, −90, −180°, and −270°), as shown. The phase shifts compensate for those arising from the different inter-element path lengths of the acoustic pulse incident on the line arrays. The resulting four signals of the rows 306 and the signals of the columns 304 will be in phase and, when summed, will form a maximum acoustic interference pattern when receiving a wavefront arriving at a about a 30° incidence angle. This maximum corresponds to the central axis of one of the main lobes of the formed beams. A second receive beam can be formed for incoming acoustic wavefronts traveling in the negative X direction and at an angle θ with the Z direction (at a −30° incidence angle) by reversing the sign of the 90° imposed phase shift on the four signals and summing the signals. Because each of the beamformers 402, 404, 412, and 414 are connected to each of the transducer elements 202, each of the non-orthogonal beams 210 includes a contribution from each of the transducer elements 202.

The vertical beamformer 424 simultaneously generates the vertical beam 212 by driving the rows 306 and columns 304 180° apart using the transformer 502. Driving the rows 306 and columns 304 in this way matches the ½ wavelength distance, d, between each row and column.

Figure 6:
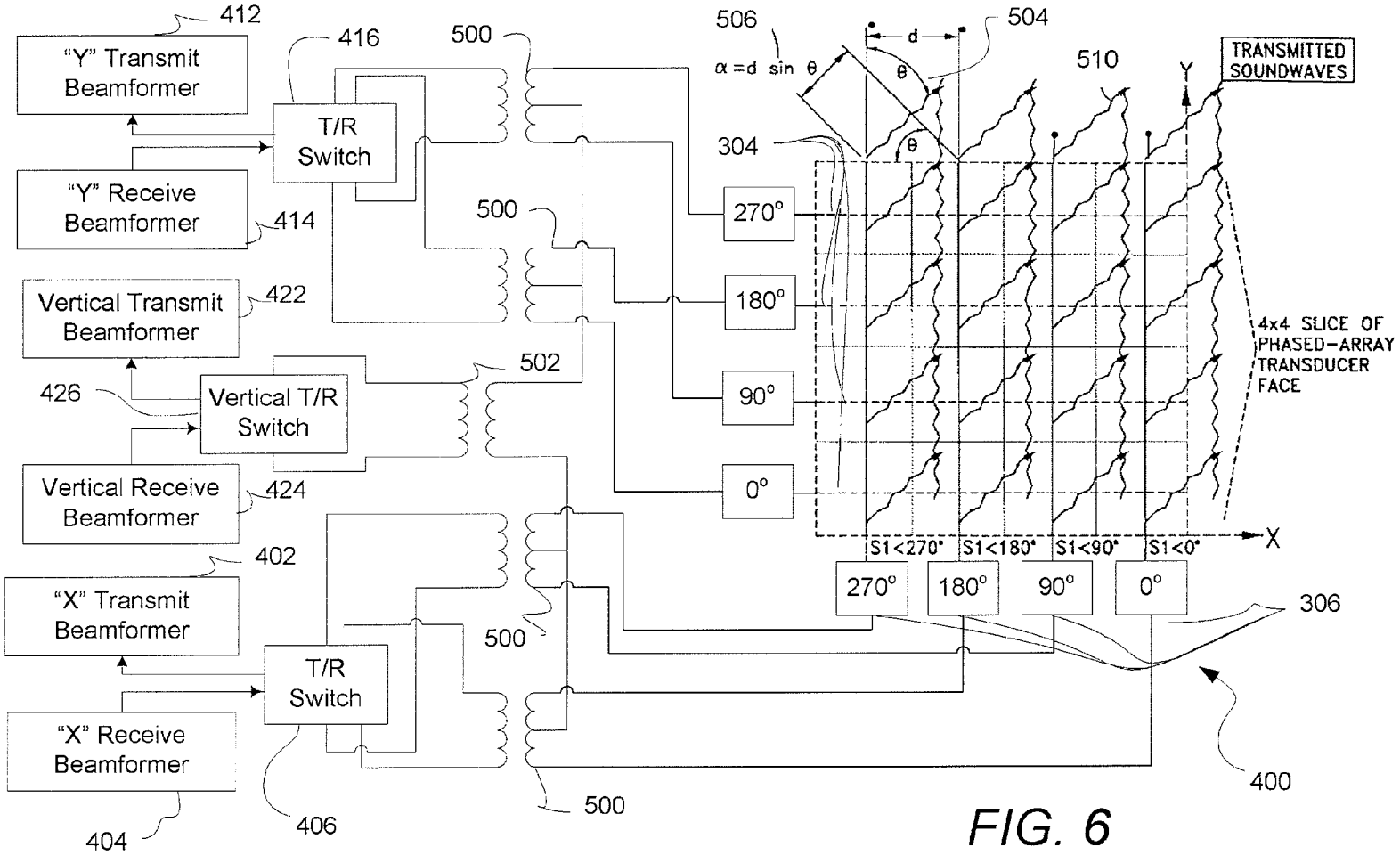
FIG. 6 is a schematic diagram illustrating in more detail one embodiment of the acoustic system illustrated in FIG. 4 when configured to transmit the beams.

FIG. 6 is a schematic diagram illustrating in more detail one embodiment of the acoustic system 400 when configured to transmit the beams 210 and 212. Transmit operation is substantially similar to receive operation described above, except that electrical signals generated by the beamformers 402, 412, and 422 are converted to acoustic signals by the transducer elements 202.

In view of the above, one will appreciate that the invention overcomes the problem of creating a vertical beam in acoustic marine instruments. For example, one embodiment includes a compact, low complexity beam forming system that provides a vertical beam formed in the aperture of a two dimensional transducer array along with beams formed in at least two other dimensions.

It is to be recognized that depending on the embodiment, certain acts or events of any of the methods described herein can be performed in a different sequence, may be added, merged, or left out all together (e.g., not all described acts or events are necessary for the practice of the method). Moreover, in certain embodiments, acts or events may be performed concurrently, e.g., through multi-threaded processing, interrupt processing, or multiple processors, rather than sequentially.

Those of skill will recognize that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. An acoustic system, comprising:

a plurality of transducer elements arranged to form a two-dimensional array and electrically connected into rows in a first dimension and columns in a second dimension;

at least two first beamforming circuits configured to generate a plurality of beams in at least two planes, each of the beams defining a non-orthogonal angle with the transducer array; and a second beamforming circuit electrically connected to each of the first beamforming circuits and configured to generate a beam orthogonal to the transducer array, wherein each of the first beamforming circuits is electrically connected to each of the transducer elements so that each of the transducer elements contributes to each of the beams in the at least two planes.

2. The system of claim 1, wherein the plurality of beams comprises a Janus configuration that is formed simultaneously with the vertical beam.

3. The system of claim 1, wherein the second beamforming circuit comprises a common mode electrical connection to each of the first beamforming circuits.

4. The system of claim 1, wherein each of the first beamforming circuits are connected to a virtual ground node for all rows and columns.

5. The system of claim 4, wherein each of the first beamforming circuits is connected to the transducer array via a respective transformer.

6. The system of claim 5, wherein the second beamforming circuit comprises a second transformer connected to the center tap of each of the respective transformers of each of the first beamforming circuits.

7. The system of claim 6, wherein the second transformer provides a common mode electrical connection to the respective transformers of each of the first beamforming circuits.

8. The system of claim 1, wherein the second beamforming circuit is connected to less than all of the transducer elements.

9. The system of claim 8, wherein the less than all of the transducer elements are adjacent to each other and positioned substantially in the center of the array of transducer elements.

10. The system of claim 1, wherein the second beamforming circuit is connected to each of the transducer elements.

11. The system of claim 1, wherein the first beamforming circuits are configured to phase shift signals in adjacent rows and columns of the transducer elements.

12. A system for generating a plurality of acoustic beams, the system comprising:

means for generating a plurality of acoustic signals, the means comprising a plurality of means for converting between an electrical signal and a respective one of the acoustic signals, wherein the converting means are arranged to form a two dimensional array and electrically connected into rows in a first dimension and columns in a second dimension;

means for simultaneously forming a plurality of first beams in at least two planes based on the acoustic signals, each of the first beams defining a non-orthogonal angle with the transducer array and wherein each of the first beams is based on each of the respective plurality of signals of each of the converting means; and means for forming a second beam orthogonal to the array based on the acoustic signals, wherein the first and second beams are formed simultaneously.

13. The system of claim 12, wherein the plurality of beams comprises a Janus configuration that is formed simultaneously with the vertical beam.

14. The system of claim 12, wherein the means for forming the second beams comprises a common mode electrical connection to means for forming the first beams.

15. The system of claim 12, wherein each of the means for forming the first beams are connected to a virtual ground node for all rows and columns.

16. The system of claim 15, wherein the means for forming the first beams comprises at least two beamforming circuits and where each of the first beamforming circuits is connected to the transducer array via a respective transformer.

17. The system of claim 16 wherein the means for forming the second beam comprises a second beamforming circuit, and wherein the second beamforming circuit comprises a second transformer connected to the center tap of each of the respective transformers of each of the first beamforming circuits.

18. The system of claim 17, wherein the second transformer provides a common mode electrical connection to the respective transformers of each of the first beamforming circuits.

19. The system of claim 12, wherein means for forming the second beam is connected to less than all of the converting means.

20. The system of claim 19, wherein the less than all of the transducer elements are adjacent to each other and positioned substantially in the center of the array of transducer elements.

21. The system of claim 12, wherein means for forming the second beam is connected to each of the converting means.

22. The system of claim 12, wherein means for forming the first beams are configured to phase shift signals in adjacent rows and columns of the converting means.

23. A method of generating a plurality of acoustic beams, the method comprising:

generating a plurality of acoustic signals in each of a plurality of transducer elements arranged to form a two dimensional array and electrically connected into rows in a first dimension and columns in a second dimension;

simultaneously forming a plurality of first beams in at least two planes based on the acoustic signals using at least two first beamforming circuits, each of the first beams defining a non-orthogonal angle with the transducer array and wherein each of the first beams is based on each of the respective plurality of signals of each of the transducer elements; and forming a second beam orthogonal to the transducer array based on the acoustic signals using a second beamforming circuit, wherein the first and second beams are formed simultaneously.

24. The method of claim 23, wherein the plurality of beams comprises a Janus configuration that is formed simultaneously with the vertical beam.

25. The method of claim 23, wherein the second beam is formed based on the signals of less than all of the transducer elements.

26. The method of claim 25, wherein the less than all of the transducer elements are adjacent to each other and positioned substantially in the center of the array of transducer elements.

27. The method of claim 23, further comprising phase shifting the acoustic signals adjacent one of the rows and columns of transducer elements.

28. The system of claim 1, further comprising controlling the aperture of the beam orthogonal to the transducer array by selecting at least one transducer element, the selected at least one transducer element comprising less than all of the transducer elements.

29. The method of claim 23, further comprising controlling the aperture of the beam orthogonal to the transducer array by selecting at least one transducer element, the selected at least one transducer element comprising less than all of the transducer elements.

*30. An acoustic system, comprising:*

*a plurality of transducer elements arranged to form a two-dimensional array and electrically connected into rows in a first dimension and columns in a second dimension;*

*a first beamforming circuit configured to generate a plurality of beams in at least two planes, each of the beams defining a non-orthogonal angle with the transducer array; and*

*a second beamforming circuit electrically connected to the first beamforming circuit and configured to generate a beam orthogonal to the transducer array, wherein the first beamforming circuit is electrically connected to each of the transducer elements so that each of the transducer elements contributes to each of the beams in the at least two planes.*

*31. The system of claim 30, wherein the plurality of beams comprises a Janus configuration that is formed simultaneously with the vertical beam.*

*32. The system of claim 30, wherein the second beamforming circuit comprises a common mode electrical connection to each of the first beamforming circuits.*

*33. The system of claim 30, wherein the first beamforming circuit is connected to a virtual ground node for all rows and columns.*

*34. The system of claim 33, wherein the first beamforming circuit is connected to the transducer array via a respective transformer.*

*35. The system of claim 34, wherein the second beamforming circuit comprises a second transformer connected to the center tap of each of the respective transformers of the first beamforming circuit.*

*36. The system of claim 35, wherein the second transformer provides a common mode electrical connection to the respective transformers of the first beamforming circuit.*

*37. The system of claim 30, wherein the second beamforming circuit is connected to less than all of the transducer elements.*

*38. The system of claim 37, wherein the less than all of the transducer elements are adjacent to each other and positioned substantially in the center of the array of transducer elements.*

*39. The system of claim 30, wherein the second beamforming circuit is connected to each of the transducer elements.*

*40. The system of claim 30, wherein the first beamforming circuit is configured to phase shift signals in adjacent rows and columns of the transducer elements.*

*41. A method of generating a plurality of acoustic beams, the method comprising:*

*generating a plurality of acoustic signals in each of a plurality of transducer elements arranged to form a two dimensional array and electrically connected into rows in a first dimension and columns in a second dimension;*

*simultaneously forming a plurality of first beams in at least two planes based on the acoustic signals using a first beamforming circuit, each of the first beams defining a non-orthogonal angle with the transducer array and wherein each of the first beams is based on each of the respective plurality of signals of each of the transducer elements; and*

*forming a second beam orthogonal to the transducer array based on the acoustic signals using a second beamforming circuit, wherein the first and second beams are formed simultaneously.*

*42. The method of claim 41, wherein the plurality of beams comprises a Janus configuration that is formed simultaneously with the vertical beam.*

*43. The method of claim 41, wherein the second beam is formed based on the signals of less than all of the transducer elements.*

*44. The method of claim 43, wherein the less than all of the transducer elements are adjacent to each other and positioned substantially in the center of the array of transducer elements.*

*45. The method of claim 41, further comprising phase shifting the acoustic signals adjacent one of the rows and columns of transducer elements.*

*46. The system of claim 30, further comprising controlling the aperture of the beam orthogonal to the transducer array by selecting at least one transducer element, the selected at least one transducer element comprising less than all of the transducer elements.*

*47. The method of claim 41, further comprising controlling the aperture of the beam orthogonal to the transducer array by selecting at least one transducer element, the selected at least one transducer element comprising less than all of the transducer elements.*

* * * * *